United States Patent [19]
Arai

[11] Patent Number: 5,731,888
[45] Date of Patent: Mar. 24, 1998

[54] APPARATUS FOR PERFORMING EXPOSURE BY SCANNING WITH OPTICAL BEAMS

[75] Inventor: Haruhiko Arai, Kanagawa, Japan

[73] Assignee: Fuji Photo Film Co., Ltd., Kanagwa, Japan

[21] Appl. No.: 757,462

[22] Filed: Nov. 27, 1996

[30] Foreign Application Priority Data

Nov. 27, 1995 [JP] Japan ................... 7-307215

[51] Int. Cl.$^6$ ................... G02B 26/08
[52] U.S. Cl. ................... 359/204; 271/226
[58] Field of Search ................... 359/204; 358/496, 358/498; 399/367, 388; 271/226, 233, 271, 248; 347/139

[56] References Cited

U.S. PATENT DOCUMENTS 5,095,370  3/1992  Takada et al. ................... 358/300

Primary Examiner—James Phan

[57] ABSTRACT

An apparatus for performing exposure by scanning with optical beams, in which exposing light sources issuing the optical beams to be deflected in a main scanning direction are used to scan and expose a web of light-sensitive material as it is transported in an auxiliary scanning direction substantially perpendicular to the main scanning direction. The apparatus has a transport guide that is positioned at least in a neighborhood of an area upstream in the auxiliary scanning direction of an exposing position where the light-sensitive material is scanned and exposed. The transport guide includes a pair of U-shaped members for regulating both end portions of the light-sensitive material in a direction of width, each of the members having at least two rollers juxtaposed in the auxiliary scanning direction in a side that faces each lateral end portion of the light-sensitive material in the direction of width. The transport guide is capable of reducing the resistance of the light-sensitive material against transport by a sufficient amount to prevent the occurrence of uneven exposure and the development of abrasion marks.

2 Claims, 6 Drawing Sheets

APPARATUS FOR PERFORMING EXPOSURE BY SCANNING WITH OPTICAL BEAMS

BACKGROUND OF THE INVENTION

This invention relates to an apparatus for performing exposure by scanning with optical beams in image recording apparatus such as printers, copiers and printing platemaking machines. The apparatus contemplated by the invention is such that exposing light sources which issue optical beams to be deflected in the main scanning direction are used to expose a web of light-sensitive material as it is transported in an auxiliary scanning direction substantially perpendicular to the main scanning direction, thereby forming a plurality of reproduced images continuously.

Consider, for example, an image recording apparatus that performs exposure by raster scan. Exposing light sources for three primary colors such as cyan (C), magenta (M) and yellow (Y) emit respective optical beams, which are shaped to parallel beams by means of associated collimator lenses and incident on an optical deflector such as a polygonal mirror to be deflected in the main scanning direction; the deflected beams pass through an fθ lens to be incident on a light-sensitive material after being adjusted such that they form focused images of predetermined shapes in predetermined positions.

The light-sensitive material in a web form is transported by transport means including one for transporting it in the auxiliary scanning direction. The light-sensitive material is first drawn out of a magazine containing it in a roll form and transported by the associated transporter at a predetermined speed in the auxiliary scanning direction which is substantially perpendicular to the main scanning direction. Therefore, the web of light-sensitive material which has been transported in the auxiliary scanning direction to the image recording position is subjected to exposure by two-dimensional scanning with the optical beams from the exposing light sources C, M and Y which are being deflected in the main scanning direction to record latent images on the entire surface of the light-sensitive material.

The transporter described above is essentially composed of roller pairs which transport the light-sensitive material as it is held between individual rollers. A transport guide comprising a pair of identical members to regulate the end portions of the web of light-sensitive material in the direction of its width is generally provided between adjacent transporter in order to ensure smooth transport of the light-sensitive material. The transport guide helps reduce the chance of the web of meandering or skewing during its continuous transport to thereby offer the advantage of producing high-quality recorded images that are free from distortion and other defects.

In apparatus of a type that perform exposure of a web of light-sensitive material by scanning with optical beams such as laser beams, uneven transport can be caused by the transporter and, even if transport guides are employed, slight meandering or skewing may occur and these phenomena will produce significantly uneven exposure or extensive distortions in the recorded image. It is therefore necessary to ensure that uneven transport, meandering, skewing and other troubles with the light-sensitive material are reduced to the smallest possible degrees. To this end, it is of course necessary to precisely control the operation of the transporter, particularly, the one for transport in the auxiliary scanning direction. Further, the image recording position of the light-sensitive material has to be strictly regulated by transport guides, particularly the one that is provided just before the exposing section.

FIG. 9 shows schematically an example of the prior art transport guide. The illustrated guide 158 is a typical example of a transport guide that is provided in both end portions of a web of light-sensitive material in the direction of width. To regulate both end portions of the light-sensitive material in the direction of width, the transport guide 158 includes a pair of members of a generally U-shaped cross section which extend in the auxiliary scanning direction. To ensure smooth transport of the light-sensitive material, the top side 144 and the inner lateral side 146 of each member are inclined outward at specified angles in an area near the receiving portion 150 at which the light-sensitive material is brought in, whereas the bottom side 148 of each member is curved at a specified curvature in the area near the receiving portion 150.

The web of light-sensitive material is inserted into the illustrated transport guide 158 at the receiving portion 150 and, with both end portions in the direction of its width being regulated (i.e., the image recording position being adjusted) along the inner lateral side 146, the light-sensitive material is transported continuously by a transporter such as transport roller pairs.

A problem with the illustrated transport guide 158 is that either end portion of the light-sensitive material in the direction of width makes linear contact with the inner lateral side 148 of each member of the guide; another problem is that if the light-sensitive material is transported as it is constantly biased toward the lateral side 146 of only one member of the transport guide, deflection develops and the surface to be exposed (or opposite surface) of the light-sensitive material will abrade against the top side 144 or bottom side 148 (or vice versa) of each member of the transport guide 158. For whichever reason, the light-sensitive material will develop an increased resistance against transport and the resulting unevenness in its transport can be a cause of uneven exposure. The greater the force that causes the light-sensitive material to be biased toward the lateral side 146 of only one member of the transport guide 158, the greater the deflection that develops, producing abrasion marks on the surface to be exposed of the light-sensitive material.

SUMMARY OF THE INVENTION

The present invention has been accomplished under these circumstances and has as an object providing an apparatus for performing exposure by scanning with optical beams, which apparatus uses a transport guide comprising a pair of U-shaped members to regulate both end portions of a web of light-sensitive material in the direction of width, each of the U-shaped members having at least two rollers in its lateral side, preferably an additional roller in its top and bottom sides so that the resistance of the light-sensitive material against transport is sufficiently reduced to prevent the occurrence of uneven exposure and the development of abrasion marks.

In order to attain the object described above, the present invention provides an apparatus for performing exposure by scanning with optical beams, in which exposing light sources issuing the optical beams to be deflected in a main scanning direction are used to scan and expose a web of light-sensitive material as it is transported in an auxiliary scanning direction substantially perpendicular to the main scanning direction. The apparatus has a transport guide that is positioned at least in a neighborhood of an area upstream in the auxiliary scanning direction of an exposing position where the light-sensitive material is scanned and exposed. The transport guide includes a pair of U-shaped members for regulating both end portions of the light-sensitive material in a direction of width, each of the members having at least two rollers juxtaposed in the auxiliary scanning direction in a side that faces each lateral end portion of the light-sensitive material in the direction of width.

Preferably, each of the members of the transport guide has at least one additional roller in either a side facing a surface to be exposed of the light-sensitive material or a side facing the other surface which is opposite the surface to be exposed or both sides.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The apparatus of the invention for performing exposure by scanning with optical beams will now be described in detail below.

The exposure apparatus of the invention uses a transport guide including a pair of U-shaped members for regulating both end portions of a web of light-sensitive material in the direction of width and the side of each member of the transport guide that faces an end portion of the, light-sensitive material in the direction of width, for example, a lateral side of each member of the transport guide has at least two rollers juxtaposed in the auxiliary scanning direction. Preferably, either the side of each member of the transport guide which faces the surface to be exposed of the light-sensitive material or the opposite side or both sides, for example, either the top side or the bottom side or both sides of each member of the transport guide have at least one additional roller. More preferably, both the side of each member of the transport guide which faces the surface to be exposed of the light-sensitive material and the opposite side, for example, both the top and the bottom sides of each member of the transport guide have at least one additional roller. At least one such transport guide is provided at least in the neighborhood of an area upstream of the exposing section of the apparatus in the auxiliary scanning direction.

Therefore, in the invention apparatus for performing exposure by scanning with optical beams, each end portion of the light-sensitive material in the direction of width makes point contact with the two rollers juxtaposed in the opposed lateral side of each member of the transport guide, thereby reducing the friction between the light-sensitive material and the transport guide; this contributes to a marked reduction not only in the meandering and skewing of the light-sensitive material but also in its resistance against transport, thereby preventing the production of recorded images with uneven exposure. If at least one additional roller is provided on both the top and bottom sides of the transport guide, there is assured the added advantage of reducing the resistance of the light-sensitive material against transport under deflection while preventing the development of abrasion marks on the light-sensitive material.

On the pages that follow, the invention apparatus for performing exposure by scanning with optical beams is described in detail with reference to the preferred examples shown in accompanying drawings. We will first describe an image recording system employing the invention apparatus for performing exposure by scanning optical beams.

Figure 1:
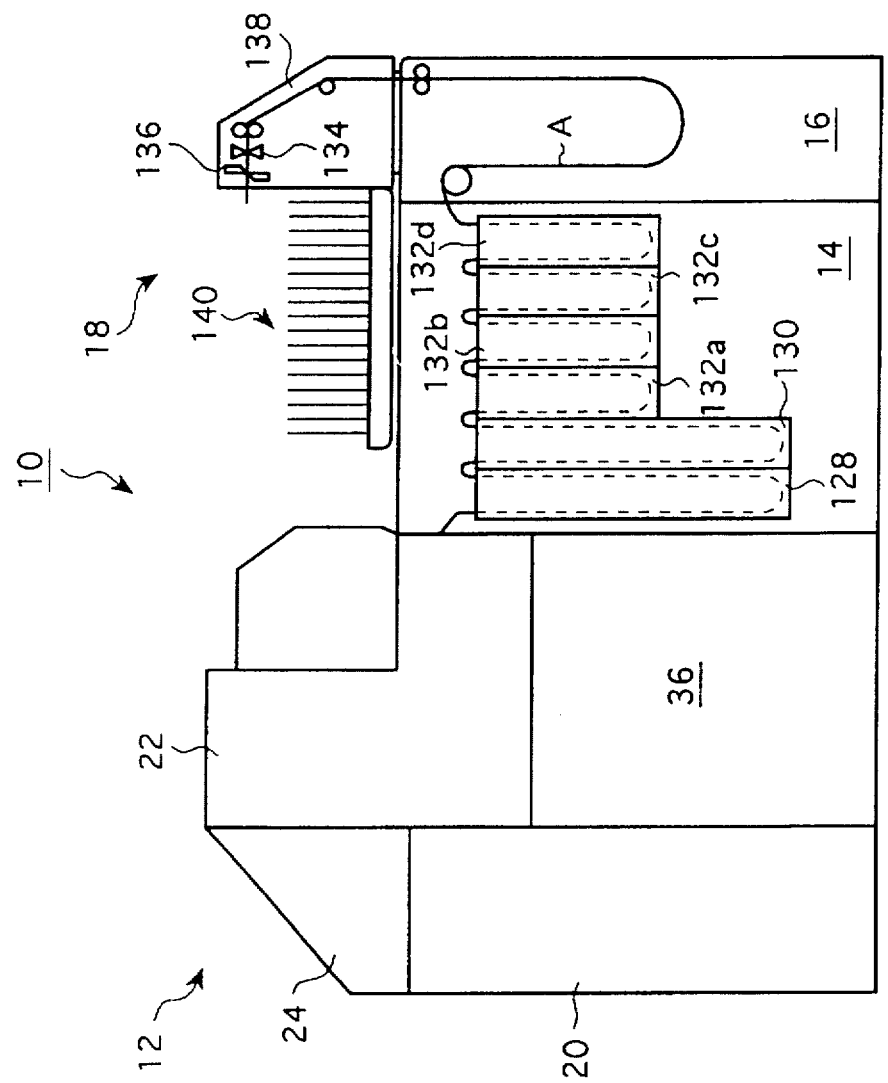
FIG. 1 shows schematically an exemplary image recording system employing the invention apparatus for performing exposure by scanning with optical beams.

FIG. 1 shows schematically an exemplary image recording system that employs the invention apparatus for performing exposure by scanning with optical beams. The image recording system generally indicated by 10 is a digital photoprinter which, in response to the image picked up with an image reader such as a film scanner, performs exposure of a light-sensitive material A to form latent images by scanning with optical beams under the exposing conditions (i.e., the conditions for image recording) that have been determined with a setup device, then performs development and other processing, and outputs prints having the film image recorded thereon.

As shown, the image recording system 10 has an image recording unit 12, a developing unit 14, a drying unit 16, an ejecting unit 18 and an electrical unit as basic parts.

The image recording unit 12 is composed of a print/transport apparatus 22 and an optical beam scanner 24.

Figure 2:
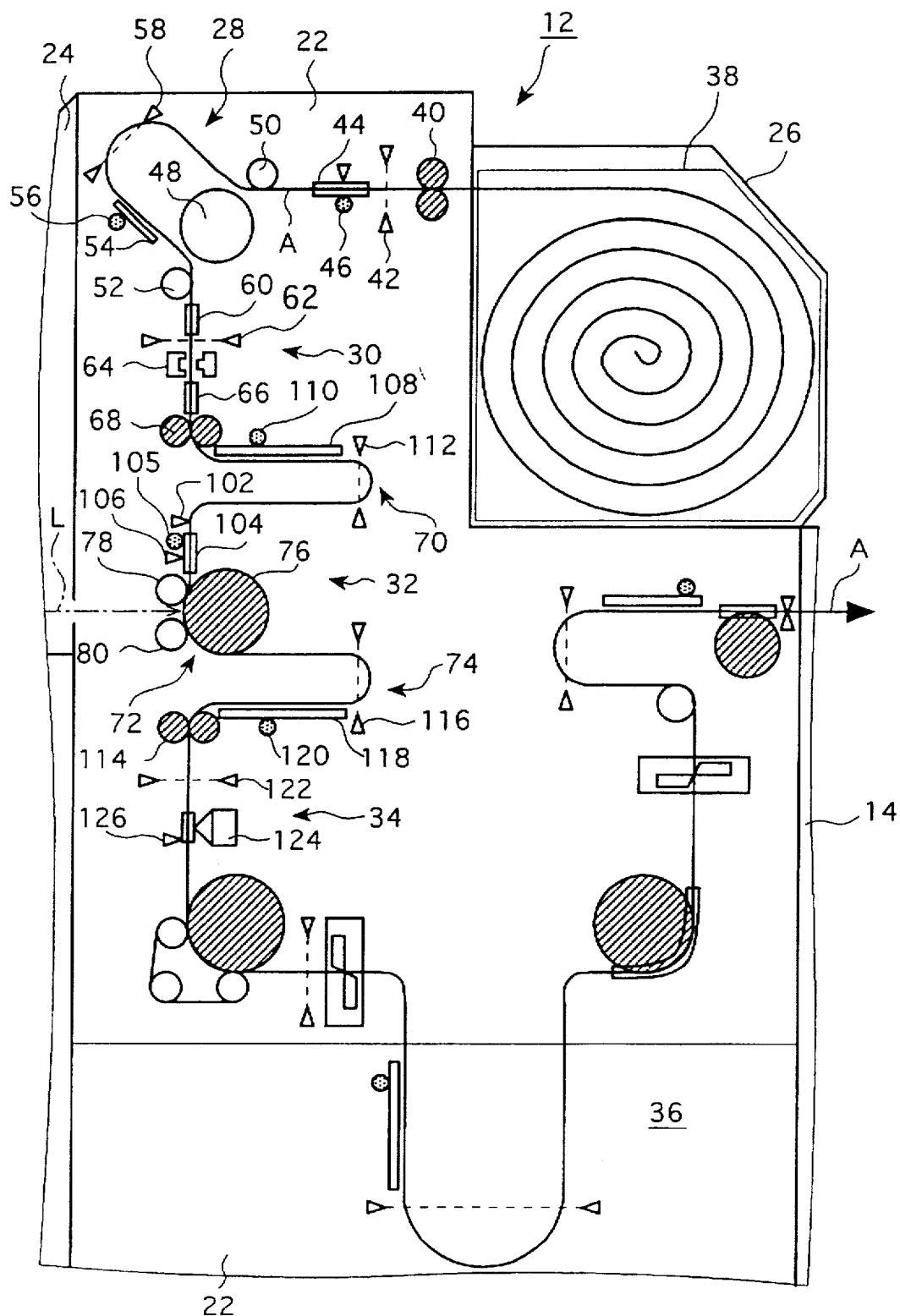
FIG. 2 shows schematically an example of the print/transport apparatus in the image recording system shown in FIG. 1.

FIG. 2 shows schematically the print/transport apparatus 22. In the print/transport apparatus 22, the light-sensitive material A is unwound from a roll and transported in a predetermined path as various processes are performed such as the recording of image position information, imagewise exposure (printing) and back printing before it is transported to developing unit 14 in the subsequent stage. As shown, the print/transport apparatus 22 has a light-sensitive material supply section 26, a first loop forming section 28, an image position information constructing section 30, an exposing section 32, a back printing section 34, a reservoir 36 and a transporter for transporting the light-sensitive material A in a predetermined path that threads through these sections.

The light-sensitive material supply section 26 is an area that is loaded with a magazine 38 having a web of light-sensitive material A wound in a roll form that is contained in a light-shielding enclosure.

Positioned downstream of the light-sensitive material supply section 26 (in the direction of transport of the light-sensitive material) are a drawing roller pair 40 which transports the light-sensitive material A as it is drawn out of the magazine 38, a sensor 42 for detecting the light-sensitive material A, a transport guide 44 comprising two identical members provided at opposite ends of the light-sensitive material A in the direction of width, and a motor 46 for driving the transport guide 44. The drawing roller pair 40 is the transporter which draws the light-sensitive material A out of the magazine 38 loaded in the light-sensitive material supply section 26 and transports it to the first loop forming section 28.

The first loop forming section 28 is provided downstream of the transport guide 44 and it forms a loop of the light-sensitive material A to thereby ensure smooth stop of the light-sensitive material A being transported by a transport roller pair 68 in the image position information constructing section 30 (to be described later) while absorbing the tension created by the transport roller pair 68. The first loop forming section 28 has a drive roller 48 for transporting the light-sensitive material A, guide rollers 50 and 52, a transport guide 54 for guiding the light-sensitive material A, a motor 56 for driving the transport guide 54, and a sensor 58 for detecting the formation of a loop of the light-sensitive material A.

In the usual operation of the image recording system 10, the light-sensitive material A in a web form is subjected to continuous image recording and developing processes and the processed web is eventually cut into "finished" prints. Therefore, in order to start the exposure of the light-sensitive material A at a specified position or to cut it in a specified position or for the purpose of back printing which is required by a certain system configuration (as in the illustrated case), there is constructed image position information such as position information for an individual print (so-called "frame information") or position information for an appropriately set unit number of prints (so-called "sort information") which may correspond to one film.

Such frame information, sort information and other types of image position information are constructed by the image position information constructing section 30 which is provided downstream of the first loop forming section 28 and comprises, in order from the upstream to the downstream side, a transport guide 60 for guiding the light-sensitive material A, a sensor 62 for detecting the papering of the light-sensitive material A, a punch 64 for perforating the light-sensitive material A, a transport guide 66, and a transport roller pair 68. To construct the image position information, holes of a given shape, say, square, may be made with the punch 64 at the advancing end of the light-sensitive material A in a position that corresponds to a single print (one frame) or the unit number of prints to be sorted.

The exposing section 32 is provided downstream of the image position information constructing section 30 and, in the illustrated image recording system 10, the exposing section 32 combines with the optical beam scanner 24 to make up an exposing unit which performs digital exposure of the light-sensitive material by two-dimensional scanning with optical beams. The essential parts of the exposing section 32 are a second loop forming portion 70, a transport mechanism for auxiliary scanning 72 and a third loop forming portion 74.

Figure 3:
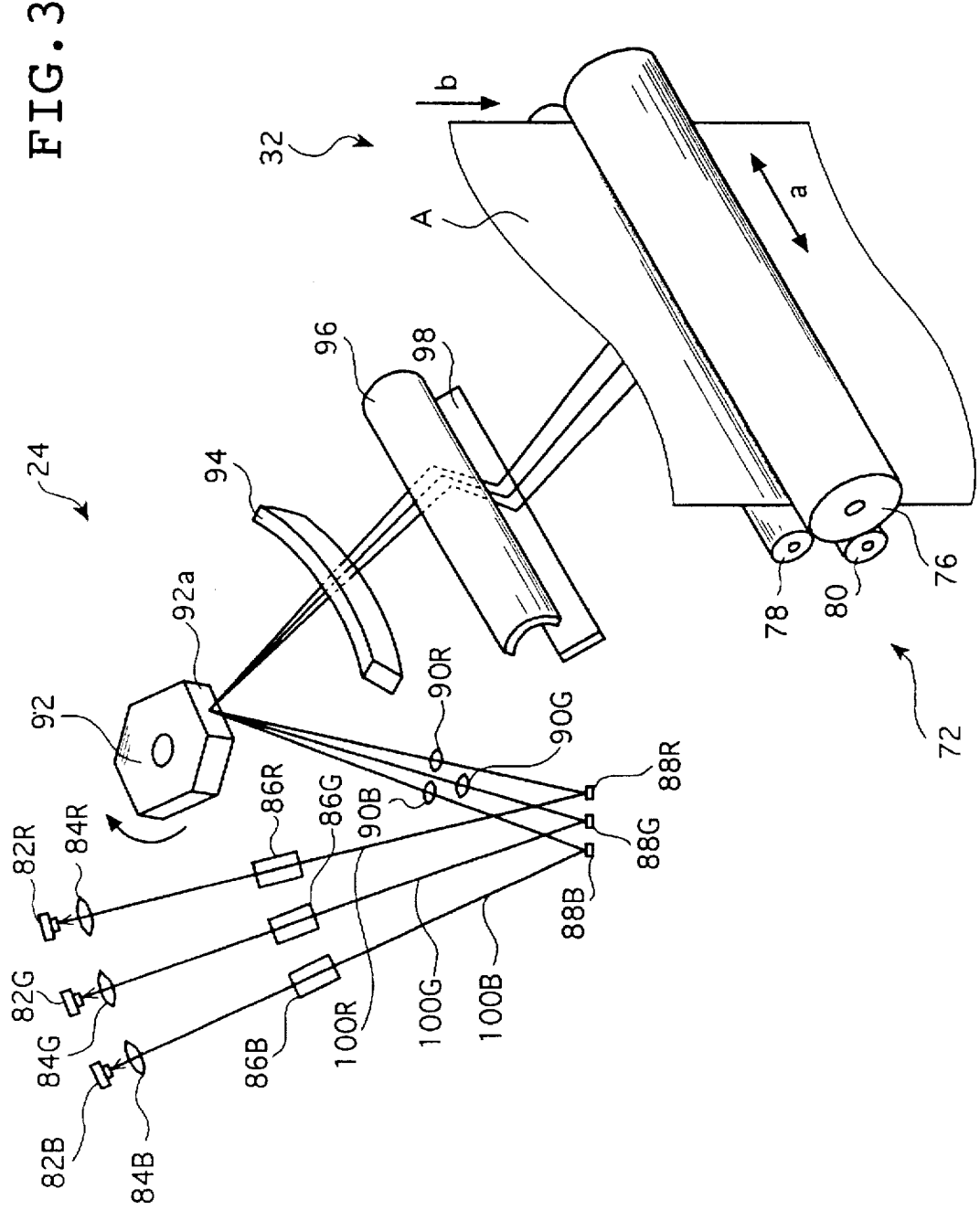
FIG. 3 shows schematically an example of the apparatus for performing exposure by scanning with optical beams as well as the transport mechanism for auxiliary scanning that are employed in the image recording system shown in FIG. 1.

FIG. 3 shows schematically the imagewise exposing section which includes the optical beam scanner 24 and the transport mechanism 72 for auxiliary scanning which is a component of the exposing section 32.

The optical beam scanner 24 is first described. It makes optics for allowing three laser beams to be incident at different angles (i.e., tri-beam non-combining optics), by which the light-sensitive material A having wavelength-dependent spectral sensitivities, in particular, a normal color light-sensitive material having spectral sensitivity peaks for three primary colors within the visible range, is exposed through scanning with optical beams of the three primary colors. As shown, the optical beam scanner 24 has a semiconductor laser (LD) 82R which issues an optical beam for exposure to red (R), a wavelength transforming laser (G-SHG) 82G which employs a SHG (second harmonic generation) device issuing an optical beam for exposure to green (G), a wavelength transforming laser (B-SHG) 82B which employs a SHG device issuing an optical beam for exposure to blue (B), which are combined with the following components arranged in order along the path of travel of the optical beams issued from the laser light sources 82R, 82G and 82B: collimator lenses 84R, 84G and 84B, AOM (acoustooptical modulators) 86R, 86G and 86B, reflector mirrors 88R, 88G and 88B, cylindrical lenses 90R, 90G and 90B, a polygonal mirror 92, an fθ lens 94, a cylindrical mirror 96, and a reflector mirror 98.

The tri-beam non-combining optics has three laser light sources 82R, 82G and 82B that emit beams of light at specified narrow-band wavelengths and which are incident on a reflecting face 92a of the polygonal mirror 92 at slightly varying angles (e.g., about 4 degrees). In the case shown in FIG. 3, the LD 82R for exposure to red emits light at a wavelength of 680 nm, the G-SHG 82G for exposure to green emits light at a wavelength of 532 nm, and the B-SHG 82B for exposure to blue emits light at a wavelength of 473 nm.

The collimator lenses 84R, 84G and 84B shape the laser beams 100R, 100G and 100B from the laser light sources 82R, 82G and 82B, respectively, such that they are rendered parallel beams. The AOM (acoustooptical modulators) 86R, 86G and 86B modulate the laser beams 100R, 100G and 100B, respectively, in accordance with image data signals for the associated colors which have been subjected to image processing with an image processor (not shown).

Each of the cylindrical lenses 90R, 90G and 90B combines with the fθ lens 94 and the cylindrical mirror 96 to make up optics for correcting the tilting of the polygonal mirror 92. The laser light sources 82R, 82G and 82B are arranged in such a way that the laser beams 100R, 100G and 100B they issue are incident on the reflecting face 92a of the polygonal mirror 92 at slightly varying angles and the reflected beams are focused to form images at different angles in the same main scanning line on the light-sensitive material A to thereby scan over the same main scanning line at timed intervals. The reflector mirrors 88R, 88G and 88B will fold back the optical paths of the laser beams 100R, 100G and 100B such that they are incident on the reflecting face 92a of the polygonal mirror 92 either at the same point or in proximate positions on the same line.

The fθ lens 94 ensures that each of the laser beams 100R, 100G and 100B will be correctly focused in any of the positions on the main scanning line. The lens is such that chromatic aberration is corrected to fall within tolerable limits irrespective of whether the incident light has a wavelength of 473 nm, 532 nm or 680 nm. The cylindrical mirror 96 combines with the cylindrical lenses 90R, 90G and 90B to make up the tilt correcting optics; the other function of the cylindrical mirror bends the respective laser beams 100R, 100G and 100B to be incident on the reflector mirror 98 which rebends the laser beams 100R, 100G and 100B to be directed toward the main scanning line which is on the light-sensitive material A being transported by transport mechanism 72 for auxiliary scanning and which is generally perpendicular to the auxiliary scanning direction.

The transport mechanism 72 for auxiliary scanning has the following components: an exposure drum 76 which transports the light-sensitive material A in the auxiliary scanning direction (indicated by arrow b in FIG. 3) which is generally perpendicular to the main scanning direction as the light-sensitive material is held in a predetermined exposing position; two nip rollers 78 and 80 that are spaced apart in the auxiliary scanning direction, with the exposing position (scanning line) lying in between, and which are urged against the exposure drum 76 with the light-sensitive material A being interposed; a sensor 102 for detecting the above-mentioned frame information to thereby detect the image recording position; a transport guide 104; a motor 105 for driving the transport guide 104; and a sensor 106 for detecting the advancing end of the light-sensitive material A.

The light-sensitive material A is transported in the auxiliary scanning direction as follows by the combination of the exposure drum 76 and nip rollers 78 and 80. If the frame information is detected with the sensor 102 shown in the print/transport apparatus 22 in FIG. 2 and when the light-sensitive material A is transported until the RECORD START position coincides with the exposing position, the optical beam scanner 24 is driven to start the exposure of the light-sensitive material A by scanning with three optical beams L. The optical beams L are deflected in the main scanning direction whereas the light-sensitive material A is transported in the auxiliary scanning direction which is perpendicular to the main scanning direction; as a result, the light-sensitive material A is exposed by two-dimensional scanning with the optical beams L to record latent images.

The second loop forming portion 70 of the exposing section 32 forms a loop of the light-sensitive material A to thereby accomplish smooth stop of the light-sensitive material A being transported by the transport roller pair 68 in the image position information constructing section 30 and absorb the difference between the transport speeds of the transport roller pair 68 and the exposure drum 76 or the tension created by these members. The second loop forming portion 70 has a transport guide 108 for guiding the light-sensitive material A, a motor 110 for driving the transport guide 108 and a sensor 112 for detecting the formation of a loop of the light-sensitive material A.

The third loop forming portion 74 forms a loop of the light-sensitive material A to thereby accomplish smooth stop of the light-sensitive material A being transported by the transport roller pair 114 and absorb the difference between the transport speeds of the transport roller pair 114 and the exposure drum 76 or the tension created by these members. The third loop forming portion 74 has a sensor 116 for detecting the formation of a loop of the light-sensitive material A, a transport guide 118 for guiding the light-sensitive material A, a motor 120 for driving the transport guide 118, a transport roller pair 114, and a sensor 122 for detecting the advancing end of the light-sensitive material A.

The back printing section 34 is where "back printing" is done by recording various print data on the back side of the print, as exemplified by the date of taking the pictures on the original film and the date of recording on the light-sensitive material A; the back printing section 34 has a printing device 124 and a sensor 126. In the illustrated case, the back printing section 34 performs back printing by thermal transfer using an ink ribbon and, more specifically, frame information is detected with the sensor 126 and the data associated with the print (frame) of interest are back printed with the printing device 124.

As already mentioned, the light-sensitive material A processed in the image recording system 10 is finally cut into finished prints and during its continuous processing starting with exposure and ending with development and subsequent treatments, the light-sensitive material A remains in a web form. It should, however, be noted that the processing speed is not the same in the image recording unit 12 and the developing unit 14 and the processing speed in the image recording unit 12 is generally faster than that in the developing unit 14.

The reservoir 36 is the place where the exposed light-sensitive material A is accommodated and it contributes to an improved processing efficiency by absorbing the difference in processing speed between the developing unit 14 and the image recording unit 12.

Described above is the basic composition of the image recording unit 12.

The developing unit 14 is a wet processor that performs developing and subsequent treatments in accordance with the type of the light-sensitive material A used. If the light-sensitive material A is a silver halide photographic material, the developing unit 14 typically includes a color developing tank 128, a bleach-fixing tank 130, rinsing tanks 132a, 132b, 132c and 132d, as shown in FIG. 1.

The drying unit 16 dries the exposed and developed light-sensitive material A by any known method.

The ejecting unit 18 cuts the dried light-sensitive material A into individual prints and, if necessary, sorts them in accordance with relevant sort information. To perform these functions, the ejecting unit 18 includes a cutting section 138 having a sensor 134 for detecting the image position information and a cutter 136 for cutting the light-sensitive material A, and a sorter 140.

The electrical unit 20 will control the above-described image recording unit 12, the developing unit 14, the drying unit 16 and the ejecting unit 18 and, hence, contains the necessary parts such as a control board and a power supply.

Having described the basic composition of the image recording system 10 which employs the invention apparatus for performing exposure by scanning with optical beams, we now describe the transport guide used in the apparatus.

Figure 4:
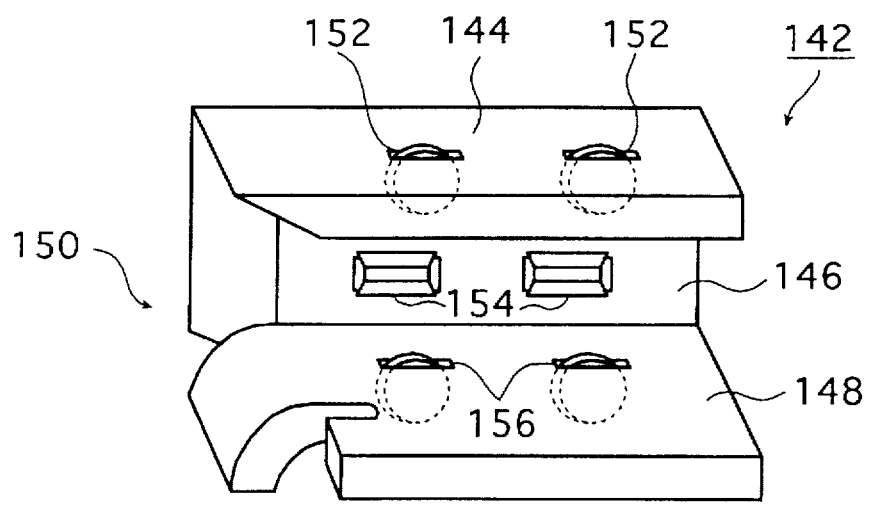
FIG. 4 shows schematically an exemplary transport guide that may be employed in the invention apparatus for performing exposure by scanning with optical beams.

FIG. 4 shows schematically an exemplary transport guide that may be employed in the invention apparatus for performing exposure by scanning with optical beams. The illustrated transport guide 142 includes a pair of members having a generally U-shaped cross section which extend in the auxiliary scanning direction. To insure smooth insertion of the light-sensitive material, the top side 144 and the lateral side 146 of each member of the guide are inclined outward at specified angles in the neighborhood of the receiving portion 150, whereas the bottom side 148 is curved outward at a specified curvature near the same receiving portion. The lateral side 146 of each member of the guide has two rollers 152 juxtaposed in the auxiliary scanning direction; the top side 144 also has two rollers 154 juxtaposed in the auxiliary scanning direction; and the bottom side 148 has two rollers 156 juxtaposed in the auxiliary scanning direction.

The transport guide as used in the invention apparatus for performing exposure by scanning with optical beams serves to regulate the end portions of the light-sensitive material A in the direction of width and is provided between adjacent transporter such as transport roller pairs, typically along both end portions of the light-sensitive material A in the direction of width. In the print/transport apparatus 22 shown in FIG. 2, the transport guide may at least be applied to the transport guide 104 which is provided near the upstream side of the exposing section 32 in the auxiliary scanning direction. Needless to say, the transport guide 142 shown in FIG. 4 is preferably applied to other transport guides.

In preparation for transport, the web of light-sensitive material A is inserted into the illustrated transport guide 148 at the receiving portion 150 such that both end portions of the light-sensitive material A face the inner lateral sides 146 of the transport guide whereas the surface to be exposed of the light-sensitive material A and the opposite surface face the top side 144 and the bottom side 148, respectively, of each member of the transport guide. The inserted light-sensitive material A makes point contact with the two juxtaposed rollers 154 in the lateral side 146 of each member of the transport guide 142 such that the end portions of the light-sensitive material A in the direction of width are regulated (i.e., the image recording position is precisely adjusted) while it is continuously transported by a transporter such as transport roller pairs.

Figure 9:
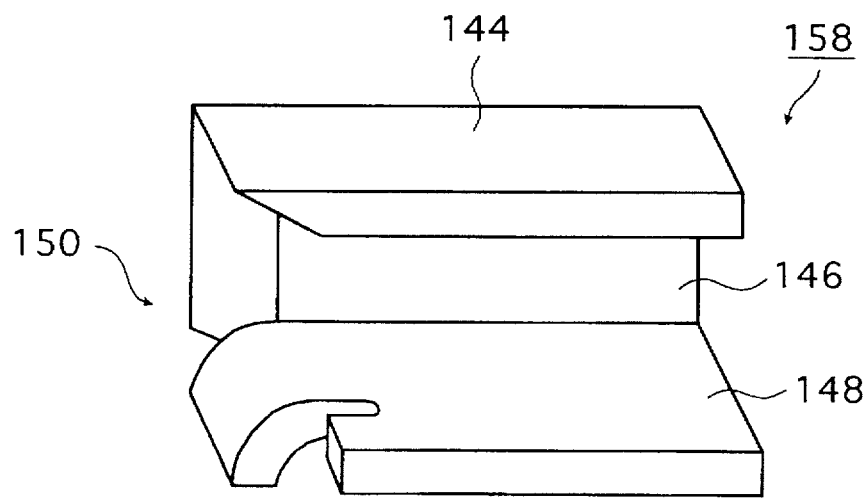
FIG. 9 shows schematically a prior art transport guide.
Figure 5A:
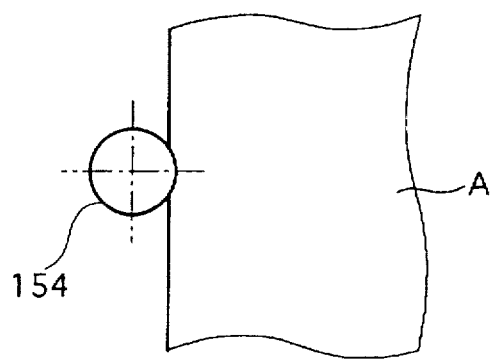
FIGS. 5a and 5b are schematic diagrams illustrating the action of an exemplary transport guide that may be employed in the invention apparatus for performing exposure by scanning with optical beams.
Figure 5B:
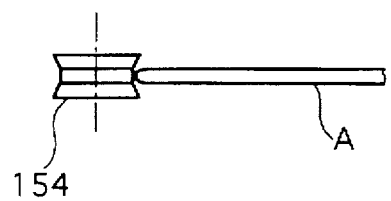

As shown in FIGS. 5a and 5b, both end portions of the light-sensitive material A in the direction of its width makes point contact (under rolling friction) with the two juxtaposed rollers 154 in the lateral side 146 of each member of the transport guide 142 and, hence, the resistance to transport of the light-sensitive material A can be appreciably reduced compared to the prior art transport guide 158 shown in FIG. 9. Stated more specifically, the relation $\mu_1 \geq 5\mu_2$ will generally hold, where $\mu_1$ is the coefficient of friction between the prior art transport guide 158 shown in FIG. 9 and the light-sensitive material A and $\mu_2$ is the coefficient of friction between the transport guide 142 to be used in the invention apparatus for performing exposure by scanning with optical beams (see FIG. 4) and the light-sensitive material A.

Figure 6A:
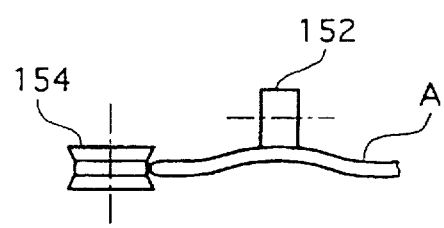
FIGS. 6a and 6b are schematic diagrams illustrating the action of another exemplary transport guide that may be employed in the invention apparatus for performing exposure by scanning with optical beams.
Figure 6B:
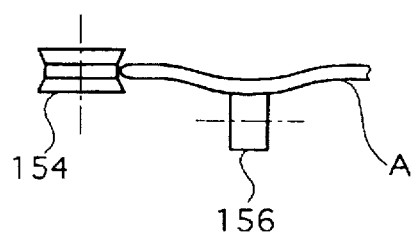

Even if the light-sensitive material A being transported is biased toward the lateral side 146 of only one member of the transport guide 142 to develop deflection as shown in FIGS. 6a and 6b, the two rollers 152 in the top side 144 and the two rollers 156 in the bottom side 148 will combine to prevent the surface to be exposed of the light-sensitive material A and the opposite surface from abrading against the top side 144 and bottom side 148, respectively, of the transport guide 142 and, hence, the resistance of the light-sensitive material A against transport can be sufficiently reduced to prevent the occurrence of uneven exposure. In addition, even if the biasing force on the light-sensitive material A, namely, the force that causes the light-sensitive material A to be biased toward the lateral side 146 of only one member of the transport guide 142 during transport, increases to develop greater deflections, there is no chance of the occurrence of abrasion marks on the surface to be exposed of the light-sensitive material A.

Figure 7A:
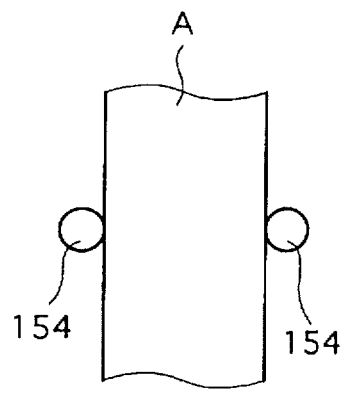
FIGS. 7a, 7b and 7c are schematic diagrams illustrating the action of rollers on the transport guide.
Figure 7B:
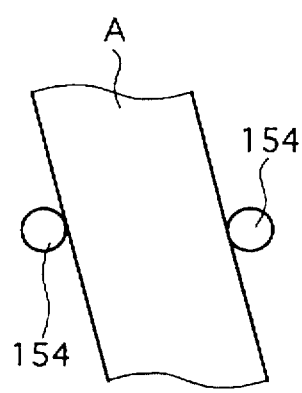
Figure 7C:
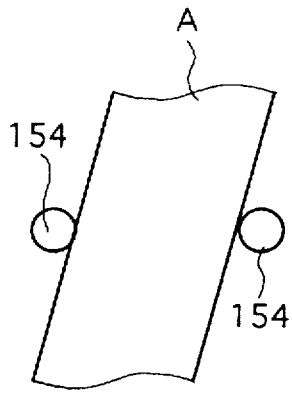

It should be mentioned here that the resistance of the web of light-sensitive material A against transport could be reduced by regulating both end portions of the web in the direction of width by means of a transport guide having only one roller 154 in the lateral side 146 of each member. However, this type of transport guide is little effective in guiding the light-sensitive material A to run in a straight line as shown in FIG. 7a and, hence, the light-sensitive material A is prone to skew as illustrated in FIGS. 7b and 7c. In addition, each end portion of the light-sensitive material A in the direction of width is supported at a single point, so if the biasing force increases, edges of the light-sensitive material A are most likely to bend or undergo certain damage.

Figure 8:
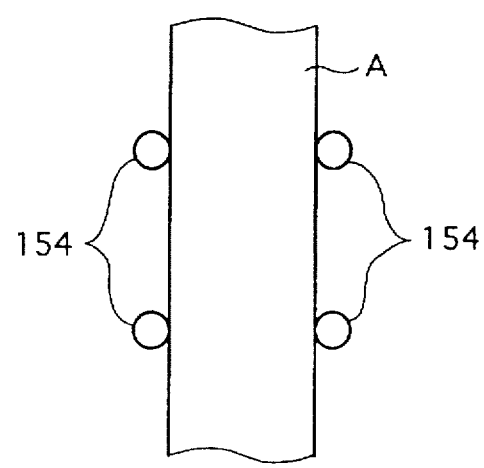
FIG. 8 is a schematic diagram illustrating the action of rollers on an exemplary transport guide to be employed in the invention apparatus for performing exposure by scanning with optical beams.

If, on the other hand, two rollers 154 are juxtaposed in the lateral side 146 of each member of the transport guide 142 in the auxiliary scanning direction as shown in FIG. 8, not only can the resistance of the light-sensitive material A against transport be reduced but it is also possible to prevent the skewing and meandering of the light-sensitive material A. In addition, each end portion of the light-sensitive material A in the direction of width is supported at two points and this is effective in preventing edges of the light-sensitive material A from bending or undergoing certain damage. To have these benefits, at least two rollers 154 are preferably juxtaposed in the lateral side 146 of each member of the transport guide 142 in the auxiliary scanning direction.

In order to ensure that neither end portion of the light-sensitive material A in the direction of width will be pinched between the lateral side 146 of each member of the transport guide 142 and the rollers 154 juxtaposed in said lateral side, each of said rollers has preferably a flange on its periphery as shown in FIGS. 4, 5 and 6.

In order to ensure that abrasion marks will not develop on the surface to be exposed of the light-sensitive material A, rollers are preferably provided in whichever of the top and bottom sides (144 and 148) that face the surface to be exposed of the light-sensitive material A. In order to reduce the resistance to transport of the light-sensitive material A under deflection, at least one additional roller may be provided in a suitable position on both the top and bottom sides (144 and 148) of each member of the transport guide 142. The constituent material of the transport guide 142 is not limited to any particular type but ABS resins and polycarbonate may be mentioned as examples.

The foregoing description concerns an example of the composition of the transport guide that may be employed in the apparatus of the invention for performing exposure by scanning with optical beams.

We next describe the operation of the image recording system 10, as well as the operation of the invention apparatus for performing exposure by scanning with optical beams.

When the magazine of light-sensitive material 38 is loaded in the light-sensitive material supply section 26, the lateral width of each of the transport guides 44, 60 and 66 is adjusted with the motor 46 to become somewhat greater than the width of the light-sensitive material A and the lateral width of the transport guide 104 is similarly adjusted with the motor 105 to become somewhat greater than the width of the light-sensitive material A. Consider a light-sensitive material A having a nominal width of 203 mm which actually measures 202.5 mm on average and 202.8 mm at maximum due to fluctuations. In this case, the lateral width of each of the transport guides 44, 60, 66 and 104 is adjusted to become 204.8 mm by taking an allowance of 1 mm on each side of the light-sensitive material A across its width, which is added to 202.8 mm, or the measured maximal width of the light-sensitive material A.

In the first loop forming section 28, the transport guide 54 is rotated with the motor 56 to be oriented parallel to the longitudinal axis of the drive roller 48. The transport guides 108 and 118 in the second and third loop forming portions 70 and 74 of the exposing section 32 are rotated by motors 110 and 120, respectively, to be oriented normal to the paper, and the nip rollers 78 and 80 in the transport mechanism 72 for auxiliary scanning in the exposing section 32 are spaced from the exposure drum 76.

When the transport guides 44, 60, 66 and 104 have their lateral width determined, the web of light-sensitive material A is drawn out of the magazine 26 by means of the drawing roller pair 40 and, after its papering is detected with the sensor 42, the light-sensitive material A is transported to the first loop forming section 28 as it is guided by the transport guide 44.

In the first loop forming section 28, the light-sensitive material A is transported by means of the drive roller 48 and the guide rollers 50 and 52 as it is guided by the transport guide 54 oriented parallel to the longitudinal axis of the drive roller 48; the light-sensitive material A is further transported to the image position information constructing section 30.

The light-sensitive material A then passes through the transport guide 60 in the image position information constructing section 30 and, after its papering is detected with the sensor 62, the light-sensitive material A passes through the punch 64 and the transport guide 66 and is further transported to the exposing section 32 by means of the transport roller pair 68.

In the exposing section 32, the light-sensitive material A passes through the transport guide 104 in the transport mechanism 72 for auxiliary scanning, i.e., the transport guide shown in FIG. 4, as it is guided by the transport guide 108 in the second loop forming portion 70. If the sensor 106 detects the advancing end of the light-sensitive material A which is passing through the transport guide 104, the lateral width of the latter is set with close tolerance until it becomes substantially equal to the width of the light-sensitive material A by means of the motor 105 as it is transported at a specified speed.

Consider again the case where the light-sensitive material A which has a nominal width of 203 mm actually measures 202.5 mm on average and 202.8 mm at maximum. Since the measured maximal width of the light-sensitive material A still has an allowance of 0.2 mm compared to the nominal width of 203 mm, the lateral width of the transport guide 104 is adjusted to a certain value between the measured maximal width of the light-sensitive material A (202.8 mm) and its nominal width (203 mm), for example, 202.9 mm which is 0.1 mm greater than the measured maximal width but 0.1 mm smaller than the nominal width.

By thusly adjusting the lateral width of the transport guide 104 with close tolerance until it becomes substantially equal to the width of the light-sensitive material A as the latter is transported at a specified speed, one can ensure that the stress during the adjustment of the lateral width of the transport guide 104 by moving its members will not concentrate at a single point on either side of the light-sensitive material A in the direction of width, thereby preventing the light-sensitive material from bending or experiencing certain damage along edges in the direction of width. In addition, the transport path of the light-sensitive material A is corrected to register with a predetermined exposing position immediately before it is brought into the exposing section 32 and this is effective in reducing the meandering of the light-sensitive material A by a sufficient degree to reproduce an undistorted high-quality image.

The light-sensitive material A is further transported by the transport roller pair 68 to pass between the exposure drum 76 and each of the nip rollers 78 and 80. Thereafter, the light-sensitive material A is transported by the transport roller pair 114 as it is guided by the transport guide 118 in the third loop forming portion 74. When the sensor 122 detects the advancing end of the light-sensitive material A being thusly transported, the drive roller 48, the transport roller pair 68, the exposure drum 76 and the transport roller pair 114 stop moving and the light-sensitive material A will accordingly come to rest.

If the sensor 122 detects the advancing end of the light-sensitive material A, the transport guide 54 is rotated by the motor 56 to become detached from the drive roller 48 as shown in FIG. 2. In addition, the transport guides 108 and 118 in the second and third loop forming portions 70 and 74 in the exposing section 32 are rotated by the motors 110 and 120, respectively, to be oriented in a level position (parallel to the paper) and the nip rollers 78 and 80 in the transport mechanism 72 for auxiliary scanning in the exposing section 32 are urged against the exposure drum 76.

Subsequently, the light-sensitive material A is further transported by the drawing roller pair 40, whereupon a first loop of the light-sensitive material A is formed in the first loop forming section 28.

If the sensor 58 detects the formation of the first loop of the light-sensitive material A, namely, if the light-sensitive material A accumulates in the first loop forming section 28 by an amount corresponding to a predetermined number of frames, the drawing roller pair 40 stops moving. Conversely, if the transport roller pair 68 transports the light-sensitive material A until there is no detectable first loop of the light-sensitive material A, the drawing roller pair 40 is driven again to move (see below).

Thus, as long as the sensor 42 detects the papering of the light-sensitive material A, namely, until the magazine 38 becomes empty of the light-sensitive material A, the drawing roller pair 40 keeps moving to ensure that the first loop of the light-sensitive material A is always formed in the first loop forming section 28 by an amount corresponding to the predetermined number of frames.

When the image information to be recorded on the light-sensitive material A is entered after a predetermined length of the light-sensitive material A has accumulated in the first loop forming section 28, the light-sensitive material A is perforated with the punch 64, whereby frame information of a specified shape is formed in the thus specified position. Thereafter, the transport roller pair 68 transports the light-sensitive material A by a distance corresponding to the length of one frame, whereupon the second loop of the light-sensitive material A is formed in the second loop forming portion 70.

After the frame information has been constructed on the light-sensitive material A by means of the punch 64, the light-sensitive material A is transported by the exposure drum 76 in combination with the nip rollers 78 and 80 and when the sensor 112 no longer detects the formation of the second loop of the light-sensitive material A, the transport roller 68 transports the light-sensitive material A by a distance corresponding to one frame length and stops moving thereafter (see below). Thus, as long as the sensor 62 detects the papering of the light-sensitive material A, the punch 64 constructs frame information per frame of the light-sensitive material A and the transport roller pair 68 keeps forming the second loop of the light-sensitive material A in the second loop forming portion 70.

If the sensor 112 detects the formation of the second loop of the light-sensitive material A, namely, if the light-sensitive material A accumulates in the second loop forming portion 70 by an amount corresponding to a predetermined number of frames, the exposure drum 76 taken in combination with the nip rollers 78 and 80 transports the light-sensitive material A such that the sensor 102 detects the frame information constructed on the light-sensitive material A.

These procedures of exposure and transport of the light-sensitive material A are repeated until the sensor 116 detects the formation of the third loop of the light-sensitive material A, i.e., the light-sensitive material A accumulates in the third loop forming portion 74 by an amount corresponding to a predetermined number of frames, whereupon the light-sensitive material A now carrying latent images is transported in frames by the transport roller pair 114 to the back printing section 34. If the relevant frame information is detected by the sensor 126 in the back printing section 34, the printing device 124 back prints the necessary information such as the date of taking the pictures on the film.

After the end of the back printing, the light-sensitive material A is accommodated in the reservoir 36, where it stays for a specified period of time before it is further transported by the transporter to the developing unit 14 (see FIG. 1).

In the developing unit 14, the light-sensitive material A is transported at a predetermined speed to pass through the color developing tank 128, bleach-fixing tank 130 and rinsing tanks 132a–132d so that they receive the respective treatments.

The developed light-sensitive material A is then dried in the drying unit 16 and transferred to the cutting section 138 of the ejecting unit 18, where the sensor 134 detects the frame information and the cutter 136 cuts the light-sensitive material A into individual finished prints, which are sorted by the sorter 140 in groups each comprising the number of prints that is determined by the sort information.

The foregoing description concerns the basic operating procedures of the image recording system 10 to which is applied the invention apparatus for performing exposure by scanning with optical beams.

While the invention apparatus for performing exposure by scanning with optical beams has been described above with reference to the case where it is applied to a digital photoprinter, it should be understood that the applicability of the invention is by no means limited to the illustrated example and that the invention apparatus for performing exposure by scanning with optical beams may be used not only with other types of printers but also with conventional image recording apparatus including copiers and printing platemaking machines. Needless to say, the invention apparatus for performing exposure by scanning with optical beams may be modified or altered in various ways without departing from the scope and spirit of the invention.

As described on the foregoing pages, the apparatus of the invention for performing exposure by scanning with optical beams uses a transport guide comprising a pair of U-shaped members, each having at least two rollers juxtaposed in the lateral side in the auxiliary scanning direction, preferably having at least one additional roller provided in either the top or bottom side or both, more preferably having at least one additional roller in both the top and bottom sides. The transport guide having this construction is provided in the neighborhood of an area upstream of the exposing section of the apparatus in the auxiliary scanning direction. Each end portion of the light-sensitive material in the direction of width makes point contact with the two rollers juxtaposed in each of the opposed lateral sides of the transport guide and the resulting marked decrease in the resistance to transport eliminates the chance of uneven transport of the light-sensitive material to thereby enable the recording of high quality images while preventing uneven exposure. If an additional roller is provided in both the top and bottom sides of each member of the transport guide, there is assured the added advantage of reducing the resistance of the light-sensitive material against transport under deflection while preventing the development of abrasion marks on the light-sensitive material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for performing exposure by scanning with optical beams, in which exposing light sources issuing the optical beams to be deflected in a main scanning direction are used to scan and expose a web of light-sensitive material as it is transported in an auxiliary scanning direction substantially perpendicular to said main scanning direction, said apparatus comprising a transport guide that is positioned at least in a neighborhood of an area upstream in said auxiliary scanning direction of an exposing position where said light-sensitive material is scanned and exposed, said transport guide comprising a pair of U-shaped members for regulating both end portions of said light-sensitive material in a direction of width, each of said members having at least two rollers juxtaposed in said auxiliary scanning direction in a side that faces each lateral end portion of said light-sensitive material in the direction of width.

2. An apparatus according to claim 1, wherein each of said members of the transport guide has at least one additional roller in either a side facing a surface to be exposed of said light-sensitive material or a side facing the other surface which is opposite said surface to be exposed or both sides.

* * * * *